US006211268B1

(12) United States Patent
Matsumura et al.

(10) Patent No.: US 6,211,268 B1
(45) Date of Patent: Apr. 3, 2001

(54) POLYOXYMETHYLENE RESIN COMPOSITION

(75) Inventors: Takatoshi Matsumura; Chiharu Nishizawa; Hiroshi Mimura; Hiroshi Yada; Kazuo Kurashige, all of Yokkaichi (JP)

(73) Assignee: Mitsubishi Gas Chemical Co Inc, Tokyo (JP)

( * ) Notice: Subject to any disclaimer, the term of this patent is extended or adjusted under 35 U.S.C. 154(b) by 0 days.

(21) Appl. No.: 09/306,832

(22) Filed: May 7, 1999

(30) Foreign Application Priority Data

May 14, 1998 (JP) ............................................ 10-132141
Jun. 24, 1998 (JP) ............................................ 10-177716

(51) Int. Cl.⁷ ........................... C08L 59/02; C08L 59/04
(52) U.S. Cl. ..................... 524/100; 524/275; 524/377; 524/378; 524/384; 524/394; 524/400
(58) Field of Search ........................... 524/100, 275, 524/400, 377, 378, 394, 384

(56) References Cited

U.S. PATENT DOCUMENTS

| 5,232,969 | * | 8/1993 | Murao ................................. 524/394 |
| 5,416,152 | * | 5/1995 | Fleischer ............................. 524/277 |
| 5,519,075 | * | 5/1996 | Matsumoto .......................... 524/100 |
| 5,837,781 | * | 11/1998 | Tanimura ............................ 525/398 |

FOREIGN PATENT DOCUMENTS

| 37-8816 | 7/1962 | (JP) . |
| 55-42085 | 10/1980 | (JP) . |
| 56-163144 | 12/1981 | (JP) . |
| 59-51937 | 3/1984 | (JP) . |
| 60-86155 | 5/1985 | (JP) . |
| 64-38463 | 2/1989 | (JP) . |
| 3-70764 | 3/1991 | (JP) . |
| 4108848 | 4/1992 | (JP) . |
| 4214756 | 8/1992 | (JP) . |
| 4224856 | 8/1992 | (JP) . |
| 6248163 | 9/1994 | (JP) . |
| 6299046 | 10/1994 | (JP) . |
| 7292187 | 11/1995 | (JP) . |
| 8-3236 | 1/1996 | (JP) . |

* cited by examiner

Primary Examiner—Patricia A. Short

(57) ABSTRACT

A polyoxymethylene resin composition comprising:
(A) 100 parts by weight of a polyoxymethylene copolymer;
(B) 0.01 to 7 parts by weight of an amine-substituted triazine compound; and
(C) 0.01 to 5 parts by weight of (C-1) polyethylene glycol having an average molecular weight of 10,000 or more and/or (C-2) modified polyolefin wax having an acidic group with an acid value of 0.5 to 60 mg-KOH/g.

According to the present invention, there can be provided a polyoxymethylene resin molded product which has low shrink anisotropy, excellent thermal stability and dimensional stability.

5 Claims, No Drawings

POLYOXYMETHYLENE RESIN COMPOSITION

DETAILED DESCRIPTION OF THE INVENTION

1. Field of the Invention

The present invention relates to a polyoxymethylene resin composition for obtaining a molded product having extremely low shrink anisotropy when it is left for long time after molding or in a high-temperature atmosphere and excellent thermal stability.

2. Prior Art

A polyoxymethylene resin is used in a wide variety of application fields such as mechanical, electric and electronic, automobile, construction material and household goods fields as a typical engineering plastic due to its excellent mechanical properties, sliding properties, chemical resistance, fatigue resistance and the like.

It is known that the polyoxymethylene resin has poor thermal stability due to its molecular structure and readily decomposes due to the break of a main chain caused by depolymerization from the terminal of the polymer or a thermal oxidization decomposition reaction. Further, since formic acid formed by the oxidation reaction of formaldehyde produced by the decomposition promotes the thermal oxidation decomposition reaction of the polyoxymethylene resin, the thermal stability of the polyoxymethylene resin is greatly impaired with the result that the practical applicability of the resin is lost. Therefore, the addition of an amine-substituted triazine compound typified by melamine, so-called "formaldehyde scavenger", is essential to the improvement of the thermal stability of the polyoxymethylene resin.

However, the addition of the amine-substituted triazine compound which is an essential ingredient for the improvement of the thermal stability of the polyoxymethylene resin increases the shrink anisotropy of a molded product, and a molded product of the polyoxymethylene resin has a large molding shrinkage factor because the polyoxymethylene resin has high crystallinity. Therefore, the application of the polyoxymethylene resin in precision parts which require high dimensional stability is limited in most cases and improvement on the shrink anisotropy of the resin has been desired.

As one of the methods for improving the shrink anisotropy of a molded product of this polyoxymethylene resin, attempts are being made to add an inorganic filler such as talc. This method can reduce shrink anisotropy to a certain degree but it involves such a problem that the characteristic properties of the polyoxymethylene resin are impaired, that is, physical properties such as impact resistance deteriorate.

Meanwhile, a technology for blending various resins to improve shrink anisotropy has been proposed as another method for improving shrink anisotropy. For example, JP-A 4-108848 (the term "JP-A" as used herein means an "unexamined published Japanese patent application") proposes polyoxymethylene homopolymer and copolymer compositions comprising different polyoxymethylenes, which involves such molding problems as a reduction in thermal stability and the difficulty of uniform plasticization. JP-A 64-38463 proposes a composition comprising a specific high-viscosity polystyrene resin, JP-A 4-214756 proposes a composition comprising a polystyrene-based resin and acryl-based resin, JP-A 6-248163 proposes a composition comprising a polycarbonate-based resin, a phenol-based polymer compound and a filler, JP-A 6-299046 proposes a composition comprising a styrene-based resin, a phenol-based polymer compound and a filler, and JP-A 7-292187 proposes a composition comprising a polystyrene-based resin having a hydroxyl group, a copolymer of a polyacrylic acid ester and styrene, and a polyfunctional isocyanate. However, all of these compositions have such a defect that the characteristic features of the polyoxymethylene resin are greatly impaired as exemplified by reductions in physical properties, deterioration in the surface state of a molded product, a reduction in thermal stability and the like caused by the occurrence of a delamination or layer separation phenomenon, a rise in viscosity and poor dispersibility.

In view of the above situation, it is an object of the present invention to provide a polyoxymethylene resin composition which can give a molded product having extremely low shrink anisotropy when it is left for a long time after molding or in a high-temperature atmosphere and excellent thermal stability without impairing the characteristic properties of a polyoxymethylene resin. It is another object of the present invention to provide a polyoxymethylene resin composition which can give a molded product required to have high dimensional stability, such as a precision part.

JP-B 37-8816 (the term "JP-B" as used herein means an "examined Japanese patent publication") discloses a method for improving the flowability of a polyoxymethylene resin at the time of molding by adding polyethylene glycol and JP-A 56-163144 discloses a method for improving the hot water resistance of a polyoxymethylene resin by adding polyethylene glycol. Surprisingly, the inventors of the present invention have found that a molded product having extremely low shrink anisotropy when it is left for a long time or in a high-temperature atmosphere is obtained by selecting polyethylene glycol having a molecular weight larger than a specific value and adding it to a polyoxymethylene copolymer together with an amine-substituted triazine compound. The present invention has been accomplished based on this finding.

Meanwhile, JP-A 59-51937 and JP-A 60-86155 disclose a method for improving the dispersibility of carbon black by adding polyolefin wax to a polyoxymethylene resin. Further, JP-A 3-70764 and JP-A 4-224856 disclose a method for improving the abrasion resistance of a polyoxymethylene resin by adding polyolefin wax. Further, JP-A 8-3236 discloses a method for improving the self-lubrication of a polyoxymethylene resin by adding polyolefin wax. Surprisingly, the present inventors have found that a molded product having extremely low shrink anisotropy when it is left for a long time or in a high-temperature atmosphere is obtained by selecting polyolefin wax having an acid value higher than a specific value and adding it to a polyoxymethylene copolymer together with an amine-substituted triazine compound. The present invention has been accomplished based on this finding.

That is, the present invention is a polyoxymethylene resin composition which substantially comprises (A) 100 parts by weight of a polyoxymethylene copolymer, (B) 0.01 to 7 parts by weight of an amine-substituted triazine compound, and (C) 0.01 to 5 parts by weight of (C-1) polyethylene glycol having an average molecular weight of 10,000 or more and/or (C-2) modified polyolefin wax having an acidic group with an acid value of 0.5 to 60 mg-KOH/g.

The present invention will be described in detail hereinunder.

The polyoxymethylene copolymer (A) used in the present invention is generally a copolymer containing 0.4 to 40 mol %, preferably 0.4 to 10 mol % of oxyalkylene units in the main chain of oxymethylene. The copolymer is obtained by polymerizing formaldehyde and/or a cyclic oligomer thereof (for example, trioxan or tetraoxan) as a main monomer/s and a cyclic ether as a copolymerizable component in the presence of a polymerization catalyst.

The cyclic ether used as a copolymerizable component is preferably a compound represented by the following general formula (1).

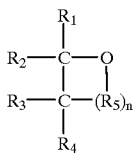

(1)

wherein $R_1$, $R_2$, $R_3$ and $R_4$ are the same or different and each a hydrogen atom or alkyl group having 1 to 5 carbon atoms, and $R_5$ is a methylene group, oxymethylene group, or methylene group or oxymethylene group substituted by an alkyl group (n is an integer of 0 to 3), or a divalent group represented by the following general formula (2) or (3) (n is 1, and m is an integer of 1 to 4).

(2)

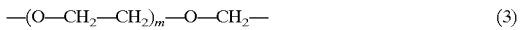

(3)

Specific examples of the cyclic ether include ethylene oxide, propylene oxide, 1,3-dioxolan, 1,3-dioxepan, 1,3,5-trioxepan, 1,3,6-trioxocan. Out of these, 1,3-dioxolan is particularly preferred from the view point of the thermal stability of the obtained resin composition.

The polymerization catalyst Is a general cationic polymerization catalyst. A compound containing boron trifluoride is preferred, as exemplified by a hydrate and coordination complex compound of boron trifluoride. Diethyl etherate of boron trifluoride which is a coordination complex with an ether is particularly preferred.

The polymerization of a polyoxymethylene copolymer can be carried out by the same device and the same method as those for the copolymerization of conventionally known trioxan. That is, it can be carried out in a batch or continuous system and can be applied to block polymerization or melt polymerization which is carried out in the presence of an organic solvent such as cyclohexane. A reaction tank equipped with a stirrer can be used for a batch system whereas a kneader, extruder, self-cleaning type continuous mixer and the like having such a function as quick hardening at the time of polymerization, high stirring ability to cope with heat generation, fine temperature control or self-cleaning to prevent the adhesion of scales are suitably used for continuous block polymerization.

The catalyst can be deactivated or removed from the polyoxymethylene copolymer obtained by a polymerization reaction in accordance with known methods which use one selected from primary, secondary and tertiary amines such as diethylamine, triethylamine, di-iso-propylamine, tri-iso-propylamine, mono-n-butylamine, dibutylamine, tributylamine, piperidine and morpholine, hydroxides of alkali metals and alkali earth metals, and trivalent organic phosphorus compounds, or an aqueous solution or an organic solution thereof. Illustrative examples of the organic solvent include alcohols such as methanol and ethanol; ketones such as acetone and methyl ethyl ketone; aromatic compounds such as benzene, toluene and xylene; and saturated hydrocarbons such as cyclohexane, n-hexane and n-heptane. Out of these, a method for deactivating a catalyst with a tertiary amine or a trivalent organic phosphorus compound (JP-B 55-42085) are preferred.

It is known that the polyoxymethylene copolymer has poor thermal stability due to its molecular structure and readily decomposes due to the break of a main chain caused by depolymerization from the terminal of the polymer or a thermal oxidization decomposition reaction. Further, since formic acid formed by the oxidation reaction of formaldehyde produced by the decomposition promotes the thermal oxidation decomposition reaction of the polyoxymethylene copolymer, the thermal stability of the polyoxymethylene copolymer is greatly impaired with the result that the practical applicability of the copolymer is lost. Therefore, the addition of a formaldehyde capturing agent is essential to the improvement of the thermal stability of the polyoxymethylene copolymer. Consequently, an amine-substituted triazine compound (B) which is a formaldehyde capturing agent is added to the polyoxymethylene copolymer in the composition of the present invention.

The amine-substituted triazine compound as the component (B) is at least one selected from amine-substituted triazines having a structure represented by the following general formula (4) and initial polycondensates of the amine-substituted triazines and formaldehyde.

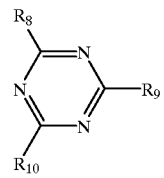

(4)

wherein $R_8$, $R_9$ and $R_{10}$ are the same or different and each a hydrogen atom, halogen atom, hydroxyl group, alkyl group, alkoxy group, aryl group, hydrogenated aryl group, amino group or substituted amino group, with the proviso that at least one of them is an amino group or substituted amino group.

Illustrative examples of the amino-substituted triazine compound or the initial polycondensate of the amino-substituted triazine compound and formaldehyde include guanamine, melamine, N-butylmelamine, N-phenylmelamine, N,N-diphenylmelamine, N,N-diallylmelamine, N,N',N"-triphenylmelamine, N,N',N"-trimethylolmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2-oxy-4,6-diamino-sym-triazine(ammeline), N,N,N',N'-tetracyanoethyl benzoguanamine and initial polycondensates of these and formaldehyde. Out of these, melamine, methylolmelamine, benzoguanamine and water-soluble melamine-formaldehyde resin are particularly preferred.

The amount of the amine-substituted triazine compound (B) is 0.01 to 7 parts by weight, preferably 0.01 to 1 part by weight based on 100 parts by weight of the polyoxymethylene copolymer. When the amount is smaller than 0.01 part by weight, a stabilizing effect is insufficient and when the amount is larger than 7 parts by weight, the obtained molded product deteriorates in physical properties and has a bad appearance.

The component (C) used in the resin composition of the present invention is polyethylene glycol (C-1) having an average molecular weight of 10,000 or more or modified polyolefin wax (C-2) having an acidic group with an acid value of 0.5 to 60 mg-KOH/g. These components (C-1) and (C-2) may be used alone or in combination.

The polyethylene glycol as the component (C-1) is obtained by the ring-opening polymerization of ethylene oxide and may have a molecular weight of 10,000 or more, generally 10,000 to 30,000, preferably 10,000 to 25,000 when it has a hydroxyl group at a terminal. The polyethylene glycol used in the present invention may be straight-chain or branched-chain. When the average molecular weight of the polyethylene glycol is smaller than 10,000, the effect of reducing shrink anisotropy is hardly observed.

The modified polyolefin wax having an acidic group with an acid value of 0.5 to 60 mg-KOH/g (component (C-2)) preferably has an average molecular weight of 30,000 or less. The component (C-2) is obtained by oxidation modifying or acid modifying polyolefin wax. To produce the modified polyolefin wax, an acidic group is introduced by the oxidation reaction of polyolefin wax, oxidation decomposing polyolefin, introducing a polar group such as a carboxyl group or sulfonic acid group by reacting polyolefin wax with an inorganic acid, organic acid or unsaturated carboxylic acid, or introducing a monomer having an acidic group during the polymerization of polyolefin wax. These are available on the market under the name of oxidation modified or acid modified polyolefin wax and can be easily acquired. The modified polyolefin wax having an acidic group preferably has an acid value of preferably 1.0 to 50 mg-KOH/g and a number average molecular weight of generally 500 to 30,000, preferably 1,000 to 20,000.

The amount of the component C in the present invention is generally 0.01 to 5 parts by weight, preferably 0.01 to 1 part by weight, more preferably 0.05 to 0.5 part by weight based on 100 parts by weight of the polyoxymethylene copolymer. When the amount is smaller than 0.01 part by weight, the effect of reducing shrink anisotropy becomes insufficient and when the amount is larger than 5 parts by weight, strength lowers disadvantageously. The above components C may be used alone or in combination of two or more.

To further improve the thermal stability of the resin composition of the present invention, a steric hindrance phenol (D) is preferably added. The steric hindrance phenol (D) is a compound having at least one structure represented by the following general formula (5) in the molecule ($R_{11}$ and $R_{12}$ are the same or different and each an alkyl group or substituted alkyl group).

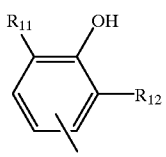

(5)

Illustrative examples of the steric hindrance phenol include 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyl dimethylamine, stearyl-3,5-di-t-butyl-4-hydroxybenzyl phosphonate, diethyl-3,5-di-t-butyl-4-hydroxybenzyl phosphonate, 2,6,7-trioxa-1-phosphorbicyclo[2,2,2]-octo-4-yl-methyl-3,5-di-t-butyl-4-hydroxyhydrocinnamate, 3,5-di-t-butyl-4-hydroxyphenyl-3,5-distearyl-thiotriazylamine, 2(2'-hydroxy-3',5'-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylallylino)-1,3,5-triazine, N,N'-hexamethylenebis(3,5-di-t-butyl-4-hydroxyhydrocinnamamide), octadecyl-3-(3,5-di-butyl-4-hydroxyphenyl)propionate, 1,6-hexanediol-bis[3-(3,5-di-t-butyl-4-hydroxyphenyl)propionate], pentaerythrithyltetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], 2,2'-thiodiethyl-bis[3-(3,5-di-t-butyl-4-hydroxyphenyl)propionate] and the like.

Out of these, a compound having at least one structure represented by the following general formula (6) in the molecule is preferred.

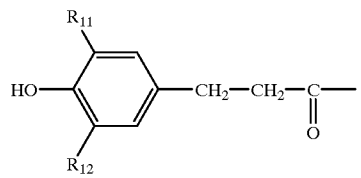

(6)

That is, preferred examples of the compound having the structure of the above general formula (6) include N,N'-hexamethylenebis(3,5-di-t-butyl-4-hydroxyhydrocinnamamide), octadecyl-3-(3,5-di-butyl-4-hydroxyphenyl)propionate, 1,6-hexanediol-bis[3-(3,5-di-t-butyl-4-hydroxyphenyl)propionate], pentaerythrithyltetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], 2,2'-thiodiethyl-bis[3-(3,5-di-t-butyl-4-hydroxyphenyl)propionate] and the like.

Out of these, more preferred are 1,6-hexanediol-bis[3-(3,5-di-t-butyl-4-hydroxyphenyl)propionate], pentaerythrithyltetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate] and 2,2'-thiodiethyl-bis[3-(3,5-di-t-butyl-4-hydroxyphenyl)propionate].

The amount of the steric hindrance phenol (D) is generally 0.01 to 5 parts by weight, preferably 0.01 to 1 part by weight based on 100 parts by weight of the polyoxymethylene copolymer (A). When the amount is smaller than 0.01 part by weight, the improvement of a stabilizing effect obtained by adding the component (D) becomes insufficient and when the amount is larger than 5 parts by weight, gas is generated during molding, or the obtained molded product has a bad appearance.

To further improve the thermal stability of the resin composition of the present invention, at least one metal compound selected from the group consisting of hydroxides, inorganic acid salts, organic acid salts and alkoxides of alkali metals and alkali earth metals is preferably added. The inorganic acid salts include carbonates, phosphates, silicates and borates. The organic acid salts include lauric acid salts, stearic acid salts, oleic acid salts or behenic acid salts. The alkoxides are alkoxides having 1 to 5 carbon atoms such as methoxides and ethoxides. Out of these, hydroxides, inorganic acid salts, organic acid salts and alkoxides of alkali earth metals are preferred, and calcium hydroxide, magnesium hydroxide, calcium carbonate and magnesium carbonate are more preferred.

The amount of at least one metal-containing compound (E) selected from the group consisting of hydroxides, inorganic acid salts, organic acid salts and alkoxides of alkali metals and alkali earth metals is generally 0.001 to 5 parts by weight, preferably 0.001 to 3 parts by weight based on 100 parts by weight of the polyoxymethylene copolymer (A). When the amount is smaller than 0.001 part by weight, the improvement of a stabilizing effect which is obtained by adding the component (E) becomes insufficient and when the amount is larger than 5 parts by weight, the obtained molded product deteriorates in physical properties and has a bad appearance.

The resin composition of the present invention may contain such additives as other stabilizer, nucleating agent, release agent, filler, pigment, lubricant, plasticizer, ultraviolet absorber, flame retardant and flame retarding aid, other resin and elastomer as required in suitable amounts. Illustrative examples of the filler include mineral fillers such as glass beads, wollastonite, mica, talc, boron nitride, calcium carbonate, kaolin, silicon dioxide, clay, asbestos, diatomaceous earth, graphite and molybdenum disulfide; inorganic fibers such as glass fibers, milled glass fibers, carbon fibers, potassium titanate fibers and boron fibers; and organic fibers such as aramid fibers.

Various methods for producing the polyoxymethylene copolymer resin composition of the present invention may be employed. It is essential to mix or melt knead predetermined components. After predetermined components are added to a polyoxymethylene copolymer which has been subjected to the deactivation of a catalyst, they are preferably pre-mixed by a mixer such as a blender or Henschel mixer. Pre-mixing can be carried out in a dry state or in the form of a moistened product, emulsion or suspension. The moistened product, emulsion and suspension are prepared by adding water, methanol, acetone, benzene, toluene, cyclohexane or other known solvent to the polyoxymethylene copolymer.

The above components may be added to the polyoxymethylene copolymer (A) in a molten state directly from an addition port formed in the barrel of an extruder without being pre-mixed.

The predetermined components and the polyoxymethylene copolymer may be melt kneaded with a kneading machine selected from single-screw and twin-screw extruders, kneader and Banbury mixer, out of which an extruder is preferred. More preferred is a single-screw or twin-screw extruder which can remove decomposed formalin and impurities at a predetermined reduced pressure from a vent port. Much more preferred is a twin-screw extruder which can remove gas at a predetermined reduced pressure from two or more vent ports.

There are a variety of twin-screw extruders, such as an extruder whose each of the two screws turn in the co-rotation or counter-roration, an extruder having a deep screw groove, an extruder having a shallow screw groove, an extruder having a normal screw, an extruder having a reverse screw and an extruder incorporating a kneading block for improving a kneading effect, an extruder having a seal ring for improving a degassing effect and the like. Basically, any extruder is acceptable if it has melt kneading capability to disperse a stabilizer well and does not impair the thermal stability of the polyoxymethylene copolymer. The melt kneading temperature is generally 160 to 270° C.

EXAMPLES

Reference examples, examples and comparative examples are given to detail the embodiments and effects of the present invention. It should be understood that the present invention is not limited to these examples.

Properties of resin compositions shown in examples and comparative examples were measured in accordance with the following methods.

(1) Thermal Stability Test

The residence time (minutes) required until silver streaks are formed at a cylinder temperature of 240° C., a mold temperature of 70° C. and a molding cycle of 30 seconds is measured as means of evaluating the silver streak formation time based on residence in a cylinder using an injection molding machine having a clamping pressure of 75 tons. The larger the value the higher the thermal stability becomes.

"Non-colored" in the table shows the result obtained when a resin composition is molded without being mixed with carbon black and "black colored" shows the result obtained when a resin composition is mixed with carbon black.

(2) Shrinkage Factor and Anisotropy Test

After a square molded plate with a fan gate measuring 100 mm in length×100 mm in width×4 mm in thickness is injection molded at a cylinder temperature of 200° C. and a mold temperature of 70° C. using an injection molding machine having a clamping pressure of 75 tons, an L gate is cut out and left at 23° C. and 50% RH for 48 hours. And then the shrinkage factor (%) and anisotropy (%) of the L gate are obtained from the following expressions as the size (mm) of the L gate in a flow direction represented by $D_{P1}$ and the size (mm) of the L gate in a direction perpendicular to the flow direction represented by $D_{V1}$.

shrinkage factor (flow direction) $S_P=(D_{P0}-D_{P1})/D_{P0}\times 100(\%)$ shrinkage factor (perpendicular direction) $S_V=(D_{V0}-D_{V1})/D_{V0}\times 100(\%)$ anisotropy$=S_P-S_V(\%)$ $D_{P0}$: size of mold in flow direction (mm)

$D_{V0}$: size of mold in perpendicular direction (mm)

$D_{P1}$: size of molded product in flow direction (mm)

$D_{V1}$: size of molded product in perpendicular direction (mm)

$S_P$: shrinkage factor of molded product in flow direction (%)

$S_V$: shrinkage factor of molded product in perpendicular direction (%)

Reference Example 1

100 parts by weight of trioxan and 4.5 parts by weight of 1,3-dioxolan as a comonomer were polymerized in a twin-screw kneader having paddles which engage each other using boron trifluoride etherate as a catalyst and methylal as a chain transfer agent. After the end of polymerization, the catalyst was deactivated with a benzene solution containing a small amount of triphenyl phosphine and milled to give a polyoxymethylene copolymer. The polyoxymethylene copolymer had an intrinsic viscosity in p-chloroform (containing α-pinene) at 60° C. of 1.45 dl/g.

Reference Example 2

100 parts by weight of trioxan and 2.5 parts by weight of ethylene oxide as a comonomer were polymerized in a twin-screw kneader having paddles which engage each other using boron trifluoride etherate as a catalyst and methylal as a chain transfer agent. After the end of polymerization, the catalyst was deactivated with a benzene solvent containing a small amount of triphenyl phosphine and milled to give a polyoxymethylene copolymer. The polyoxymethylene copolymer had an intrinsic viscosity in p-chloroform (containing α-pinene) at 60° C. of 1.43 dl/g.

Example 1

0.3 part by weight of triethylene glycol-bis[3-(3-t-butyl-5-methyl-4-hydroxyphenyl)propionate] (of Ciba Geigy Co., Ltd., steric hindrance phenol under the trade name of Irganox 245) as a stabilizer, 0.1 part by weight of melamine, 0.05 part by weight of magnesium hydroxide and 0.2 part by weight of polyethylene glycol having an average molecular weight of 10,000 were added to 100 parts by weight of the polyoxymethylene copolymer produced in Reference Example 1 and pre-mixed with a Henschel mixer. Thereafter, the resulting mixture was melt kneaded at a cylinder temperature of 200° C. using a twin-screw extruder having a vent port, and pelletized to produce a resin composition. The color of the resin composition was adjusted by blending 0.3 part by weight of carbon black into the pellets and melt kneading with a twin-screw extruder again. The evaluation results are shown in Table 1.

Examples 2 and 3

Polyoxymethylene resin compositions were produced in the same manner as in Example 1 except that the average molecular weight of polyethylene glycol was changed to 20,000 and 25,000, and evaluated. The evaluation results are shown in Table 1.

Comparative Example 1

A polyoxymethylene resin composition was produced in the same manner as in Example 1 except that the average molecular weight of polyethylene glycol was changed to 6,000 and evaluated. The evaluation results are shown in Table 1.

Comparative Examples 2 to 4

Polyoxymethylene resin compositions were produced in the same manner as in Example 1 except that polyethylene glycol was removed and the amount of melamine was changed to 0.0 to 0.1 part by weight, and evaluated. The evaluation results are shown in Table 1.

Examples 4 to 7

Polyoxymethylene resin compositions were produced in the same manner as in Example 1 except that the amount of polyethylene glycol (average molecular weight of 20,000) was changed to 0.05 to 0.4 part by weight, and evaluated. The evaluation results are shown in Table 1.

Example 8 and Comparative Example 5

After 10 parts by weight of talc was mixed with the pellets of the polyoxymethylene resin composition produced in Example 1, the resulting mixture was melt kneaded with a twin-screw extruder at a cylinder temperature of 200° C. and pelletized to produce a resin composition. The color of the resin composition was adjusted by blending 0.3 part by weight of carbon black with the pellets and melt kneading with a twin-screw extruder again. The evaluation results are shown in Table 1. For comparison, the evaluation results of a resin composition which did not contain polyethylene glycol are shown in Table 1.

Example 9 and Comparative Example 6

0.3 part by weight of triethylene glycol-bis[3-(3-t-butyl-5-methyl-4-hydroxyphenyl)propionate] (of Ciba Geigy Co., Ltd., steric hindrance phenol under the trade name of Irganox 245) as a stabilizer, 0.1 part by weight of melamine, 0.05 part by weight of magnesium hydroxide and 0.2 part by weight of polyethylene glycol having an average molecular weight of 20,000 were added to 100 parts by weight of the polyoxymethylene copolymer produced in Reference Example 2 and pre-mixed with a Henschel mixer. Thereafter, the resulting mixture was melt kneaded at a cylinder temperature of 200° C. using a twin-screw extruder having a vent port, and pelletized to produce a resin composition. The color of the resin composition was adjusted by blending 0.3 part by weight of carbon black into the pellets and melt kneading with a twin-screw extruder again. The evaluation results are shown in Table 1. The evaluation results of a resin composition obtained by eliminating polyethylene glycol are shown in Table 1 for comparison.

TABLE 1

| | | Stabilizer | | | | |
|---|---|---|---|---|---|---|
| | Type of comonomer | Polyethylene Glycol (part by weight) | Amine-substituted triazine compound (part by weight) | Steric hindrance Phenol (part by weight) | Metal compound (part by weight) | Inorganic filled material (part by weight) |
| Ex. 1 | 1,3-dioxolan | A-1 (0.20) | B-1 (0.10) | C-1 (0.30) | D-1 (0.05) | |
| Ex. 2 | 1,3-dioxolan | A-2 (0.20) | B-1 (0.10) | C-1 (0.30) | D-1 (0.05) | |
| Ex. 3 | 1,3-dioxolan | A-3 (0.20) | B-1 (0.10) | C-1 (0.30) | D-1 (0.05) | |
| Ex. 4 | 1,3-dioxolan | A-2 (0.05) | B-1 (0.10) | C-1 (0.30) | D-1 (0.05) | |
| Ex. 5 | 1.3-dioxolan | A-2 (0.10) | B-1 (0.10) | C-1 (0.30) | D-1 (0.05) | |
| Ex. 6 | 1,3-dioxolan | A-2 (0.15) | B-1 (0.10) | C-1 (0.30) | D-1 (0.05) | |
| Ex. 7 | 1,3-dioxolan | A-2 (0.40) | B-1 (0.10) | C-1 (0.30) | D-1 (0.05) | |
| Ex. 8 | 1,3-dioxolan | A-2 (0.20) | B-1 (0.10) | C-1 (0.30) | D-1 (0.05) | E-1 (10.00) |
| Ex. 9 | ethylene oxide | A-2 (6.20) | B-1 (0.10) | C-1 (0.30) | D-1 (0.05) | |
| Comp. Ex. 1 | 1,3-dioxolan | A-4 (0.20) | B-1 (0.10) | C-1 (0.30) | D-1 (0.05) | |

TABLE 1-continued

| | | | | | |
|---|---|---|---|---|---|
| Comp. Ex. 2 | 1,3-dioxolan | B-1 (0.10) | C-1 (0.30) | D-1 (0.05) | |
| Comp. Ex. 3 | 1,3-dioxolan | B-1 (0.05) | C-1 (0.30) | D-1 (0.05) | |
| Comp. Ex. 4 | 1,3-dioxolan | | C-1 (0.30) | D-1 (0.05) | |
| Comp. Ex. 5 | 1,3-dioxolan | B-1 (0.10) | C-1 (0.30) | D-1 (0.05) | E-1 (10.00) |
| Comp. Ex. 6 | ethylene oxide | B-1 (0.10) | C-1 (0.30) | D-1 (0.05) | |

| | Shrink anisotropy (100 mm × 100 mm × 4 mm) | | | Thermal stability (minutes) | |
|---|---|---|---|---|---|
| | Shrinkage factor (flow direction) | Shrinkage factor (perpendicular direction) | Anisotropy | Non-colored | Black-colored |
| Ex. 1 | 2.29% | 2.20% | 0.09% | 70 | 35 |
| Ex. 2 | 2.26% | 2.18% | 0.08% | 70 | 40 |
| Ex. 3 | 2.26% | 2.17% | 0.09% | 70 | 35 |
| Ex. 4 | 2.33% | 2.22% | 0.11% | 70 | 30 |
| Ex. 5 | 2.29% | 2.20% | 0.09% | 70 | 35 |
| Ex. 6 | 2.27% | 2.19% | 0.08% | 70 | 35 |
| Ex. 7 | 2.24% | 2.18% | 0.06% | 70 | 40 |
| Ex. 8 | 2.06% | 2.00% | 0.06% | 50 | 20 |
| Ex. 9 | 2.27% | 2.18% | 0.09% | 50 | 25 |
| Comp. Ex. 1 | 2.32% | 2.18% | 0.14% | 60 | 20 |
| Comp. Ex. 2 | 2.29% | 2.14% | 0.15% | 60 | 20 |
| Comp. Ex. 3 | 2.30% | 2.17% | 0.13% | 30 | 10 |
| Comp. Ex. 4 | 2.34% | 2.32% | 0.02% | 5 | Unmeasurable |
| Comp. Ex. 5 | 2.10% | 1.99% | 0.11% | 40 | 10 |
| Comp. Ex. 6 | 2.29% | 2.13% | 0.16% | 40 | 10 |

Ex.: Example
Comp. Ex.: Comparative Example
A-1: Polyethylene glycol (average molecular weight of 10,000)
A-2: Polyethylene glycol (average molecular weight of 20,000)
A-3: Polyethylene glycol (average molecular weight of 25,000)
A-4: Polyethylene glycol (average molecular weight of 6,000)
B-1: Melamine
C-1: Irganox 245
D-1: Magnesium hydroxide
E-1: Talc

Example 10

0.3 part by weight of triethylene glycol-bis[3-(3-t-butyl-5-methyl-4-hydroxyphenyl)propionate] (of Ciba Geigy Co., Ltd., steric hindrance phenol under the trade name of Irganox 245) as a stabilizer, 0.1 part by weight of melamine, 0.05 part by weight of magnesium hydroxide and 0.2 part by weight of polyethylene wax F-1 [of an acid value modified type, molecular weight of 4,000, acid value of 1.0 mg-KOH/g] were added to 100 parts by weight of the polyoxymethylene copolymer produced in Reference Example 1 and pre-mixed with a Henschel mixer. Thereafter, the resulting mixture was melt kneaded at a cylinder temperature of 200° C. using a twin-screw extruder having a vent port, and pelletized to produce a resin composition. The color of the resin composition was adjusted by blending 0.3 part by weight of carbon black into the pellets and melt kneading with a twin-screw extruder again. The evaluation results are shown in Table 2.

Example 11

A polyoxymethylene resin composition was produced in the same manner as in Example 10 except that polyethylene wax F-2 [of an acid value modified type, molecular weight of 3,200, acid value of 12 mg-KOH/g] was used in place of polyethylene wax F-1. The evaluation results are shown in Table 2.

Example 12

A polyoxymethylene resin composition was produced in the same manner as in Example 10 except that polyethylene wax F-3 [of an acid value modified type, molecular weight of 2,700, acid value of 30 mg-KOH/g] was used in place of polyethylene wax F-1. The evaluation results are shown in Table 2.

Example 13

A polyoxymethylene resin composition was produced in the same manner as in Example 10 except that polypropylene wax F-4 [of an acid value modified type, molecular weight of 8,000, acid value of 2.0 mg-KOH/g] was used in place of polyethylene wax F-1. The evaluation results are shown in Table 2.

Examples 14 to 16

Polyoxymethylene resin compositions were produced in the same manner as in Example 10 except that the amount of polyethylene wax F-1 [of an acid value modified type, molecular weight of 4,000, acid value of 1.0 mg-KOH/g] was changed to 0.05 to 0.4 part by weight. The evaluation results are shown in Table 2.

Comparative Example 7

A polyoxymethylene resin composition was produced in the same manner as in Example 10 except that polyethylene wax F-5 [of a general high-density type, molecular weight of 8,000, acid value of 0 mg-KOH/g] was used in place of polyethylene wax F-1. The evaluation results are shown in Table 2.

Comparative Example 8

A polyoxymethylene resin composition was produced in the same manner as in Example 10 except that high molecular weight polyethylene wax F-6 [molecular weight of 100,000] was used in place of polyethylene wax F-1. The evaluation results are shown in Table 2.

Example 17 and Comparative Example 9

After 10 parts by weight of talc was mixed with the pellets of the polyoxymethylene resin composition produced in Example 10, the resulting mixture was melt kneaded with a twin-screw extruder at a cylinder temperature of 200° C. and pelletized to produce a resin composition. The color of the resin composition was adjusted by blending 0.3 part by weight of carbon black with the pellets and melt kneading with a twin-screw extruder again. The evaluation results are shown in Table 2. For comparison, the evaluation results of a resin composition which did not contain polyethylene wax are shown in Table 2.

Example 18 and Comparative Example 10

0.3 part by weight of triethylene glycol-bis[3-(3-t-butyl-5-methyl-4-hydroxyphenyl)propionate] (of Ciba Geigy Co., Ltd., steric hindrance phenol under the trade name of Irganox 245) as a stabilizer, 0.1 part by weight of melamine, 0.05 part by weight of magnesium hydroxide and 0.2 part by weight of polyethylene wax F-1 [of an acid value modified type, molecular weight of 4,000, acid value of 1.0 mg-KOH/g] were added to 100 parts by weight of the polyoxymethylene copolymer produced in Reference Example 2 and pre-mixed with a Henschel mixer. Thereafter, the resulting mixture was melt kneaded at a cylinder temperature of 200° C. using a twin-screw extruder having a vent port, and pelletized to produce a resin composition. The color of the resin composition was adjusted by blending 0.3 part by weight of carbon black into the pellets and melt kneading with a twin-screw extruder again. The evaluation results are shown in Table 2. The evaluation results of a resin composition obtained by eliminating polyethylene wax are shown in Table 2 as comparison.

TABLE 2

| | | | Stabilizer | | | |
|---|---|---|---|---|---|---|
| | Type of comonomer | Polyolefin Wax (part by weight) | Amine-substituted triazine compound (part by weight) | Steric hindrance Phenol (part by weight) | Metal compound (part by weight) | Inorganic filled material (part by weight) |
| Ex. 10 | 1,3-dioxolan | F-1 (0.20) | B-1 (0.10) | C-1 (0.30) | D-1 (0.05) | |
| Ex. 11 | 1,3-dioxolan | F-2 (0.20) | B-1 (0.10) | C-1 (0.30) | D-1 (0.05) | |
| Ex. 12 | 1,3-dioxolan | F-3 (0.20) | B-1 (0.10) | C-1 (0.30) | D-1 (0.05) | |
| Ex. 13 | 1,3-dioxolan | F-4 (0.20) | B-1 (0.10) | C-1 (0.30) | D-1 (0.05) | |
| Ex. 14 | 1,3-dioxolan | F-1 (0.05) | B-1 (0.10) | C-1 (0.30) | D-1 (0.05) | |
| Ex. 15 | 1,3-dioxolan | F-1 (0.10) | B-1 (0.10) | C-1 (0.30) | D-1 (0.05) | |
| Ex. 16 | 1,3-dioxolan | F-1 (0.40) | B-1 (0.10) | C-1 (0.30) | D-1 (0.05) | |
| Ex. 17 | 1,3-dioxolan | F-1 (0.20) | B-1 (0.10) | C-1 (0.30) | D-1 (0.05) | E-1 (10.00) |
| Ex. 18 | ethylene oxide | F-1 (0.20) | B-1 (0.10) | C-1 (0.30) | D-1 (0.05) | |
| Comp. Ex. 7 | 1,3-dioxolan | F-5 (0.20) | B-1 (0.10) | C-1 (0.30) | D-1 (0.05) | |
| Comp. Ex. 8 | 1,3-dioxolan | F-6 (0.20) | B-1 (0.10) | C-1 (0.30) | D-1 (0.05) | |
| Comp. Ex. 9 | 1,3-dioxolan | | B-1 (0.10) | C-1 (0.30) | D-1 (0.05) | E-1 (10.00) |
| Comp. Ex. 10 | ethylene oxide | | B-1 (0.10) | C-1 (0.30) | D-1 (0.05) | |

| | Shrink anisotropy (100 mm × 100 mm × 4 mm) | | | Thermal stability (minutes) | |
|---|---|---|---|---|---|
| | Shrinkage factor (flow direction) | Shrinkage factor (perpendicular direction) | Anisotropy | Non-colored | Black-colored |
| Ex. 10 | 2.38% | 2.30% | 0.08% | 70 | 35 |
| Ex. 11 | 2.30% | 2.21% | 0.09% | 70 | 30 |
| Ex. 12 | 2.26% | 2.17% | 0.09% | 70 | 30 |
| Ex. 13 | 2.27% | 2.18% | 0.09% | 70 | 30 |
| Ex. 14 | 2.33% | 2.22% | 0.11% | 65 | 25 |
| Ex. 15 | 2.37% | 2.28% | 0.09% | 70 | 30 |
| Ex. 16 | 2.39% | 2.32% | 0.07% | 70 | 35 |
| Ex. 17 | 2.18% | 2.11% | 0.07% | 50 | 15 |
| Ex. 18 | 2.27% | 2.18% | 0.09% | 50 | 20 |
| Comp. Ex. 7 | 2.32% | 2.18% | 0.15% | 60 | 20 |
| Comp. Ex. 8 | 2.32% | 2.18% | 0.16% | 60 | 20 |
| Comp. Ex. 9 | 2.22% | 2.10% | 0.12% | 40 | 5 |
| Comp. Ex. 10 | 2.29% | 2.13% | 0.16% | 40 | 10 |

Ex.: Example
Comp. Ex.: Comparative Example
F-1: Polyethylene wax (of acid value modified type: average molecular weight of 4,000, acid value of 1.0 mg-KOH/g)
F-2: Polyethylene wax (of acid value modified type: average molecular weight of 3,200, acid value of 12 mg-KOH/g)
F-3: Polyethylene wax (of acid value modified type: average molecular weight of 2,700, acid value of 30 mg-KOH/g)
F-4: Polyethylene wax (of acid value modified type: average molecular weight of 8,000, acid value of 2.0 mg-KOH/g)
F-5: Polyethylene wax (of acid value modified type: average molecular weight of 8,000, acid value of 0 mg-KOH/g)
F-6: High molecular weight polyethylene (average molecular weight of 100,000)
B-1: Melamine
C-1: Irganox 245
D-1: Magnesium hydroxide
E-1: Talc Since the polyoxymethylene copolymer resin composition of the present invention has extremely low shrink anisotropy when it is left for a long time after molding or in a high-temperature atmosphere and excellent thermal stability, it is suitable for use as a molding material for such an application field that requires dimensional stability as precision parts. The resin composition of the present invention is free from a reduction in thermal stability, reductions in mechanical properties and deterioration in the surface state of a molded product, all of which are the problems of the prior art methods for improving shrink anisotropy by blending various resins and fillers. Therefore, it can be widely used in such application fields such as automobiles, electric and electronic parts, construction materials and household goods in which a polyoxymethylene resin has been used.

What is claimed is:

1. A polyoxymethylene resin composition comprising:
   (A) 100 parts by weight of a polyoxymethylene copolymer which contains 0.4 to 10 mol % of oxyalkylene derived from 1,3-dioxolan on the main chain of oxymethylene;
   (B) 0.01 to 7 parts by weight of an amine-substituted triazine compound;
   (C) 0.01 to 5 parts by weight of (C-1) polyethylene glycol having an average molecular weight of 10,000 or more and/or (C-2) modified polyolefin wax having an acidic group with an acid value of 0.5 to 60 mg-KOH/g;
   (D) 0.01 to 5 parts by weight of steric hindrance phenol; and
   (E) 0.001 to 5 parts by weight of at least one metal compound selected from the group consisting of hydroxides, inorganic acid salts, organic acid salts and alkoxides of alkali metals and alkali earth metals.

2. The polyoxymethylene resin composition of claim 1, wherein the polyoxymethylene copolymer (A) is produced by polymerizing trioxan and 1,3-dioxolan as a copolymerizable component in the presence of boron trifluoride or a coordination compound thereof as a catalyst.

3. A polyoxymethylene resin composition comprising:
   (A) 100 parts by weight of a polyoxymethylene copolymer which contains 0.4 to 10 mol % of oxyalkylene units derived from 1,3-dioxolan in the main chain of oxymethylene;
   (B) 0.01 to 7 parts by weight of an amine-substituted triazine compound;
   (C) 0.01 to 5 parts by weight of polyethylene glycol having an average molecular weight of 10,000 or more;
   (D) 0.01 to 5 parts by weight of steric hindrance phenol; and
   (E) 0.001 to 5 parts by weight of at least one metal compound selected from the group consisting of hydroxides, inorganic acid salts, organic acid salts and alkoxides of alkali metals and alkali earth metals.

4. A polyoxymethylene resin composition comprising:
   (A) 100 parts by weight of a polyoxymethylene copolymer which contains 0.4 to 10 mol % of oxyalkylene units derived from 1,3-dioxolan in the main chain of oxymethylene;
   (B) 0.01 to 7 parts by weight of an amine-substituted triazine compound;
   (C) 0.01 to 5 parts by weight of modified polyolefin wax having an acidic group with an acid value of 0.5 to 60 mg-KOH/g;
   (D) 0.01 to 5 parts by weight of steric hindrance phenol; and
   (E) 0.001 to 5 parts by weight of at least one metal compound selected from the group consisting of hydroxides, inorganic acid salts, organic acid salts and alkoxides of alkali metals and alkali earth metals.

5. A molded product formed from the resin composition of claim 1, 3 or 4.

* * * * *